Oct. 23, 1951 J. N. BINNS ET AL 2,572,003
RECEIPT ISSUING NIGHT DEPOSITORY
Filed Oct. 14, 1949 9 Sheets-Sheet 1
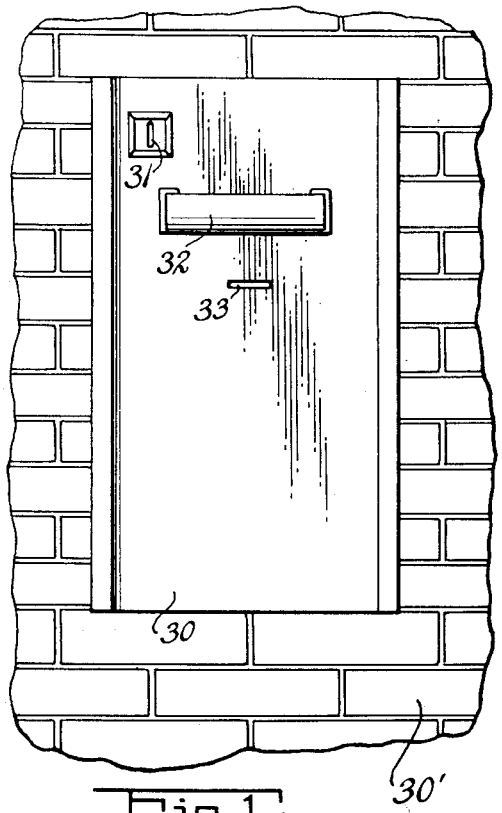
Fig. 1.
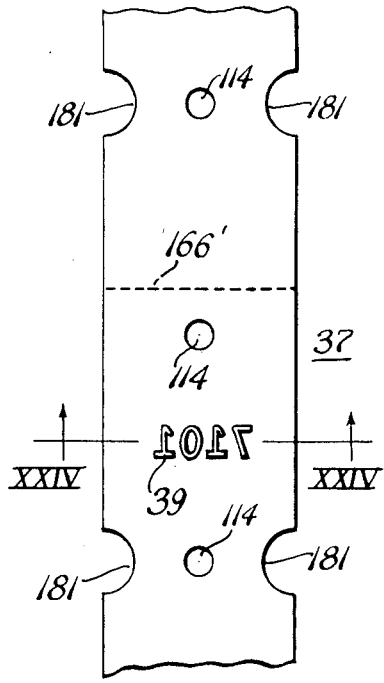
Fig. 23.
Fig. 24.
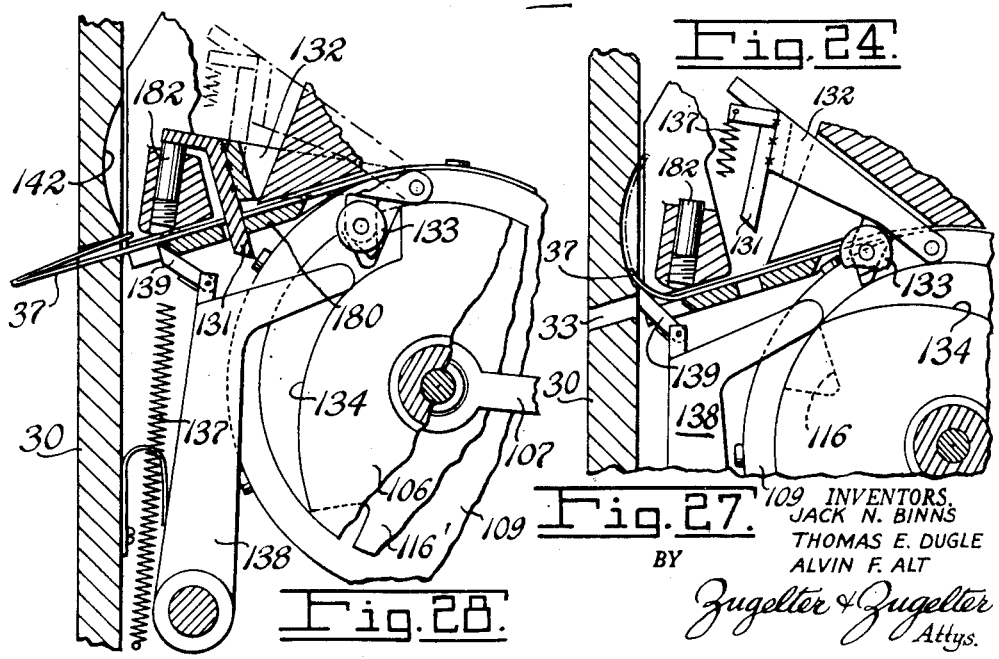
Fig. 28. Fig. 27.
INVENTORS.
JACK N. BINNS
THOMAS E. DUGLE
BY ALVIN F. ALT
Zugelter & Zugelter
Attys.

Oct. 23, 1951         J. N. BINNS ET AL         2,572,003
                RECEIPT ISSUING NIGHT DEPOSITORY
Filed Oct. 14, 1949                           9 Sheets-Sheet 2
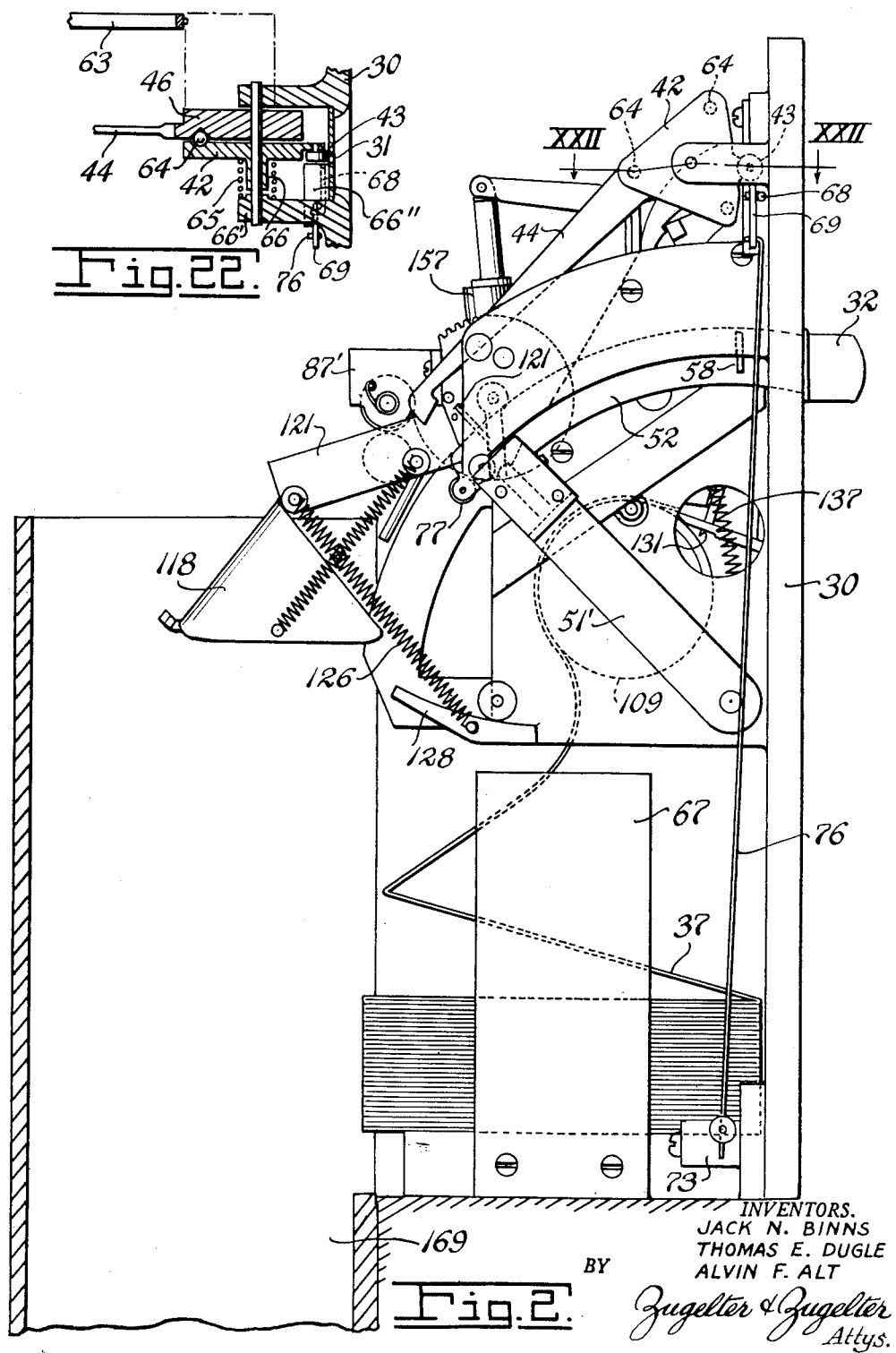
INVENTORS.
JACK N. BINNS
THOMAS E. DUGLE
ALVIN F. ALT
BY Zugelter & Zugelter
Attys.

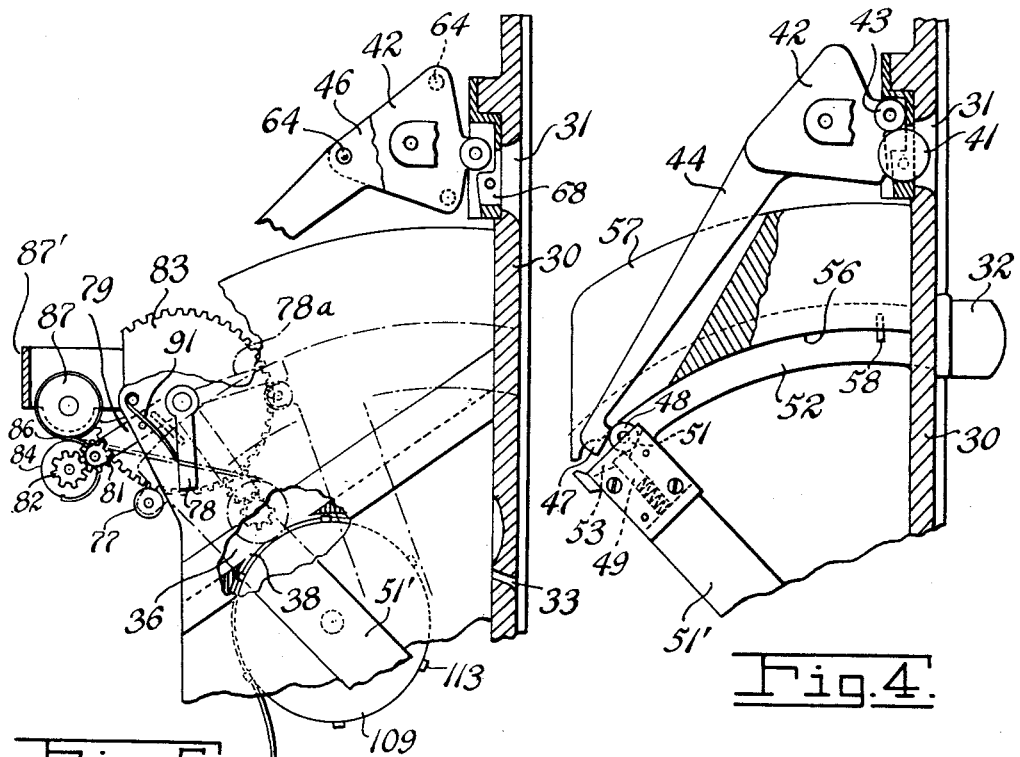

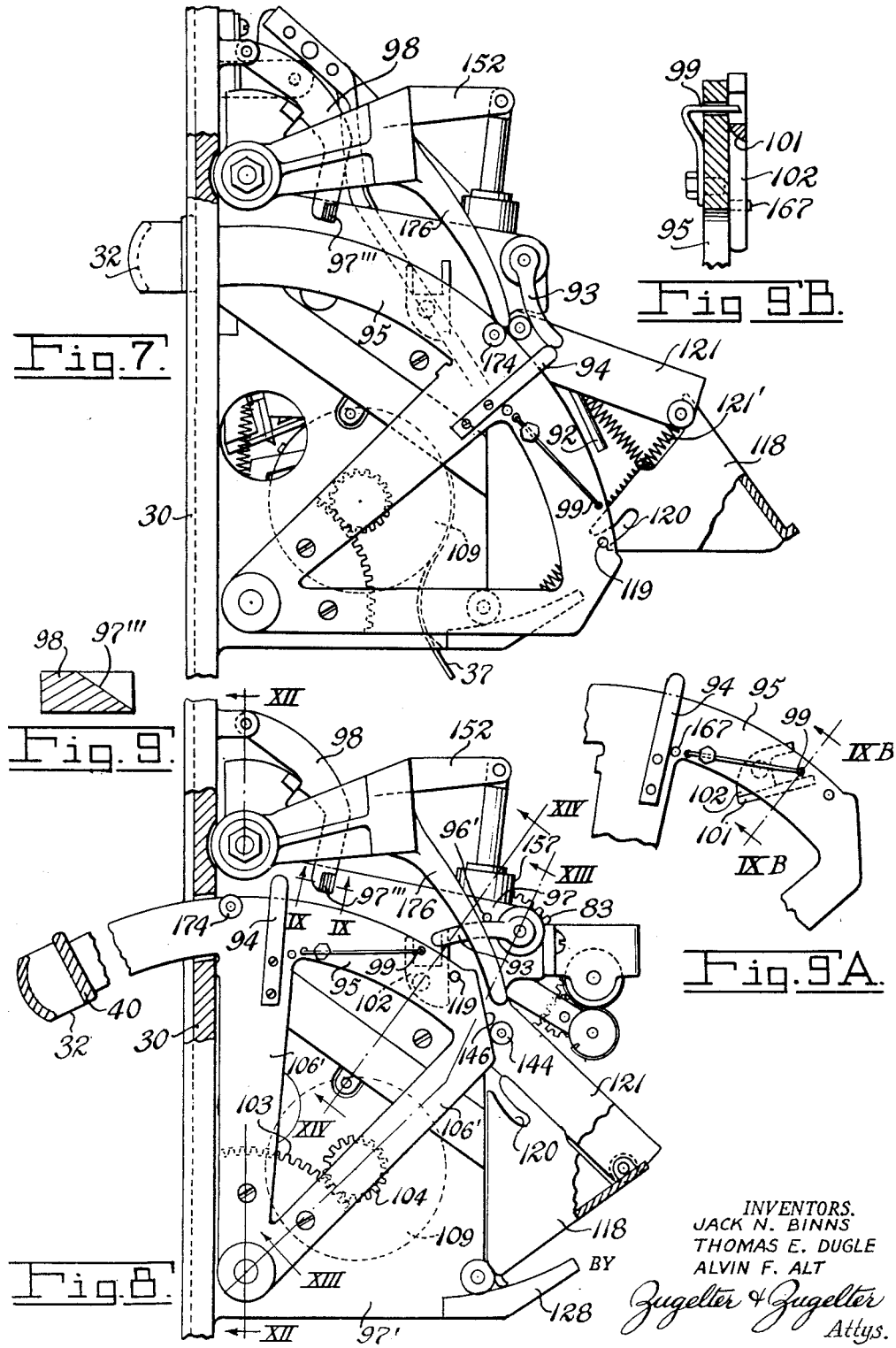

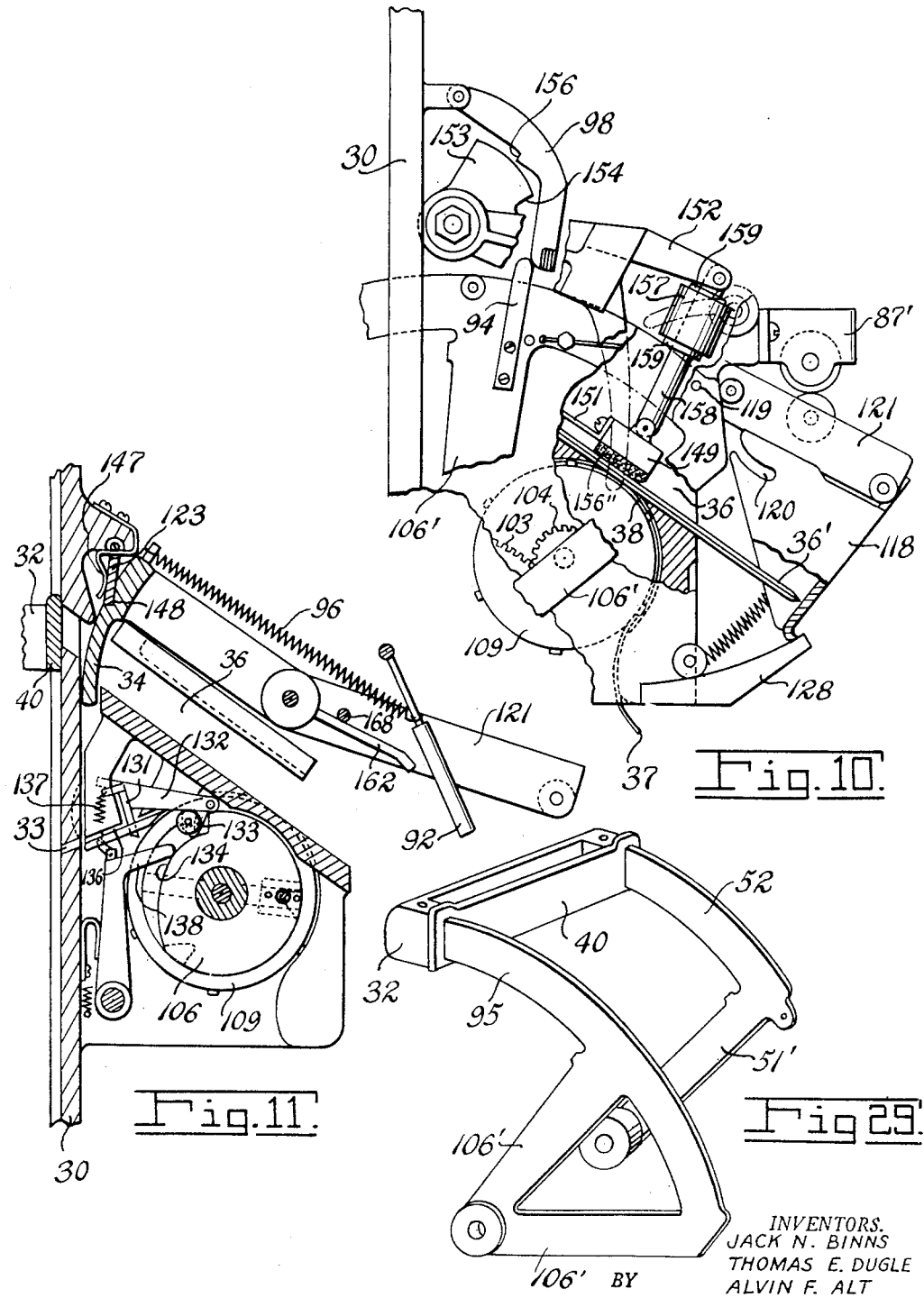

Oct. 23, 1951  J. N. BINNS ET AL  2,572,003
RECEIPT ISSUING NIGHT DEPOSITORY
Filed Oct. 14, 1949  9 Sheets-Sheet 7

INVENTORS.
JACK N. BINNS
THOMAS E. DUGLE
ALVIN F. ALT
BY Zugelter & Zugelter
Attys.

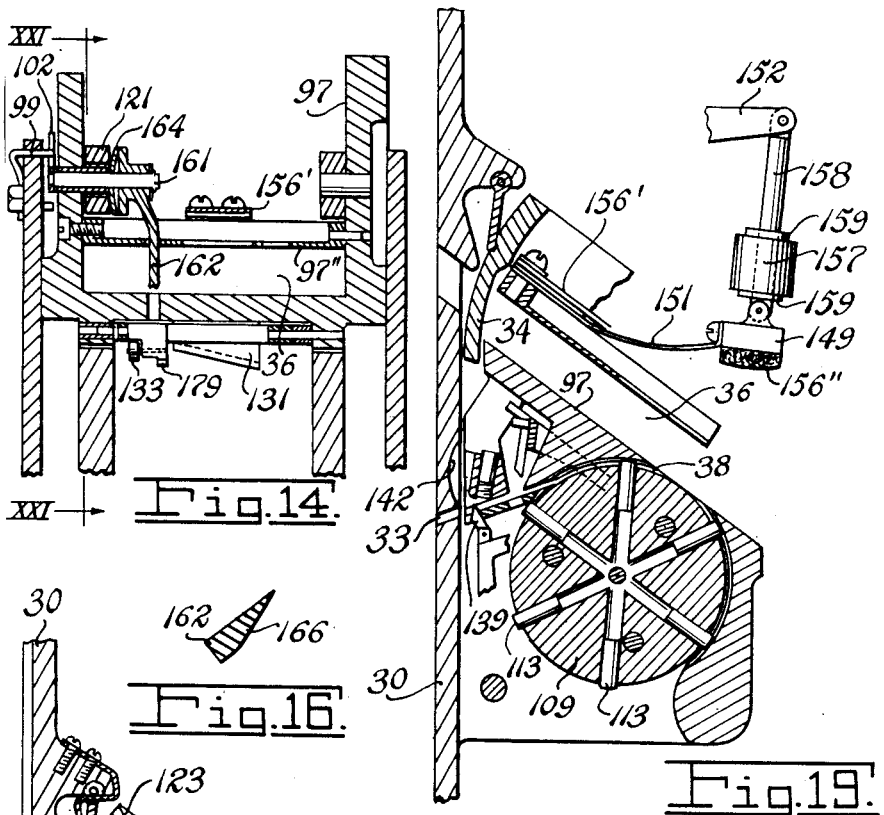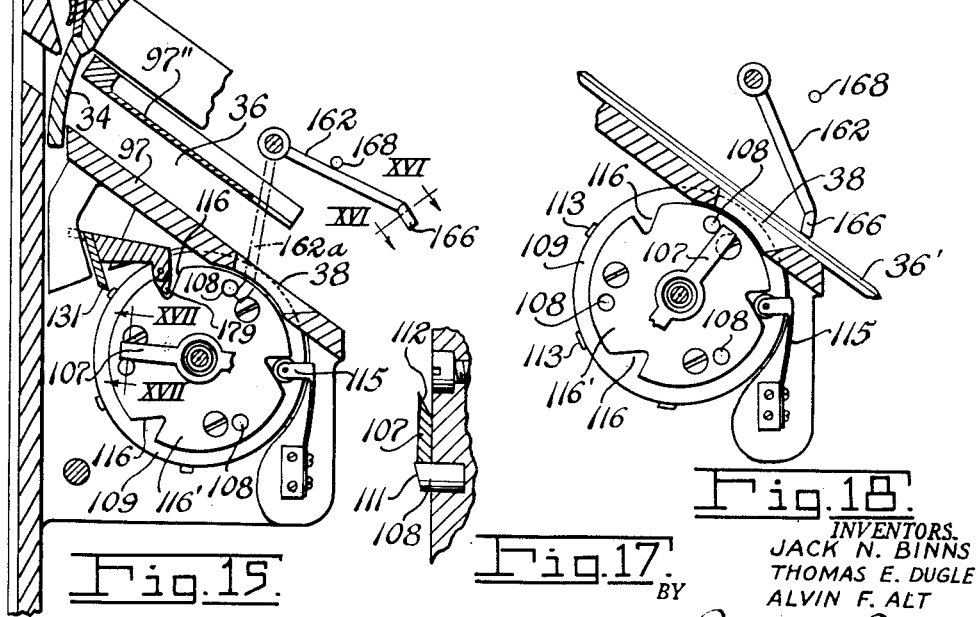

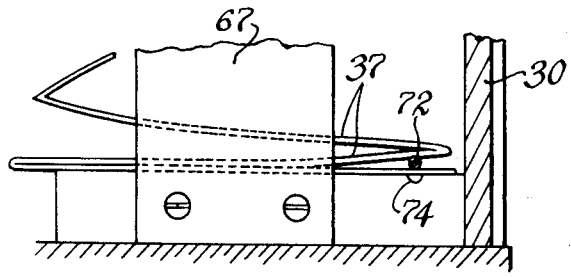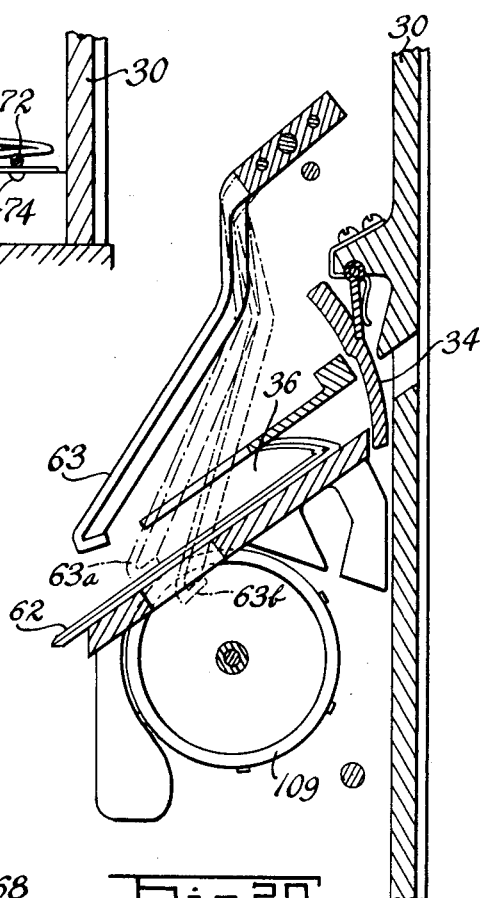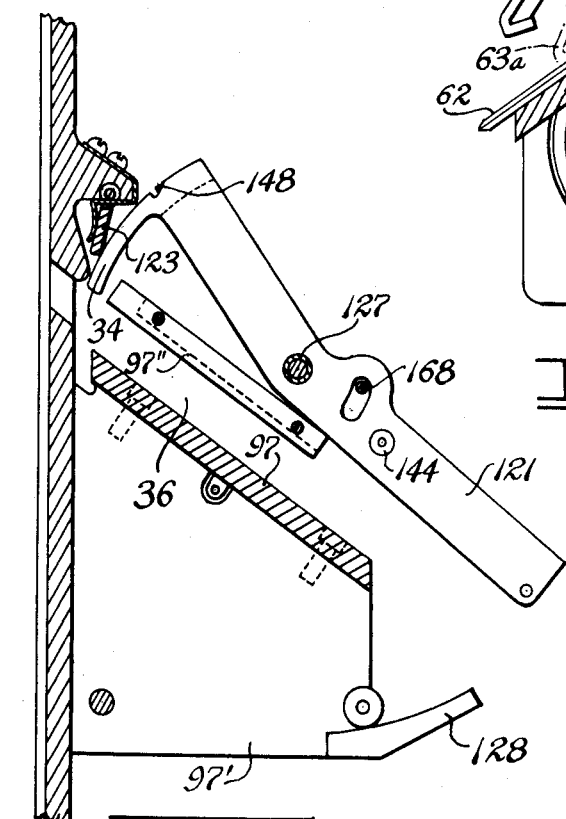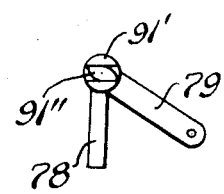

Patented Oct. 23, 1951

2,572,003

UNITED STATES PATENT OFFICE 2,572,003

RECEIPT ISSUING NIGHT DEPOSITORY

Jack N. Binns and Thomas E. Dugle, Cincinnati, and Alvin F. Alt, Hamilton County, Ohio, assignors to The Mosler Safe Company, Hamilton, Ohio, a corporation of New York Application October 14, 1949, Serial No. 121,416

19 Claims. (Cl. 346—22)

This invention relates to a depository of the type generally referred to as a "night depository." More particularly this invention relates to a depository which automatically issues receipts for deposits and to a mechanically operated receipt issuing night depository or the like.

The depository of this invention is of the type generally described in the copending application of John J. Murtaugh, Jr., Serial No. 52,481 filed October 2, 1949.

An object of this invention has been to provide a night depository in which a receipt is issued for each package deposited therein.

A further object of this invention is to provide a night depository which prints indicia on a package deposited therein and automatically issues a receipt bearing the same indicia as are printed on the package.

A further object of this invention is to provide a receipt issuing night depository which is wholly mechanical in operation and requires no electrical or hydraulic connections.

A further object of this invention is to provide a receipt issuing depository which can issue a receipt only after a package has been inserted therein.

A further object of this invention is to provide a receipt issuing depository which cannot be opened so long as a package is disposed within the depository so that a package cannot be removed once it has been stamped and, if a package becomes lodged in the depository, the package cannot be reached by a subsequent depositor.

A further object of this invention is to provide a receipt issuing depository in which the receipt acts as a printing plate for printing indicia on a package inserted in the depository prior to issuance of the receipt.

A further object of this invention is to provide a receipt issuing depository which folds the receipt before issuance to protect inked indicia thereon.

Briefly this invention provides a receipt issuing depository which employs receipt tickets having indicia embossed thereon. The indicia are automatically inked when the depository door is opened and the indicia on the ticket are impressed on a package when the package is disposed in the receptacle of the depository. Then, the ticket is issued to the depositor to make a record of his deposit while the package drops into a vault. Stops are provided so that once the indicia have been impressed on the package, the package cannot be removed from the depository, and the depository cannot be reopened until the package falls into a vault. Further, a disengaging mechanism or clutch is provided to prevent the issuance of a ticket when no package has been placed in the receptacle of the depository. The ticket is folded with the inked indicia inside the folded ticket before the ticket is issued to protect the inked indicia. The device is wholly mechanical in operation requiring no electrical or hydraulic connections so that the depository cannot be put out of working order by power failures, fluid leaks, or the like.

The above and other objects and features of the invention will in part be obvious and will in part be apparent from the following detailed description taken in connection with the accompanying drawings, in which:

Figure 1 is a view in front elevation showing a receipt issuing depository constructed in accordance with an embodiment of this invention;

Fig. 2 is a view in side elevation of the depository illustrated in Fig. 1;

Fig. 4 is a schematic view partly in side elevation and partly in section showing a coin actuated release for the depository;

Fig. 5 is a schematic view, partly in elevation and partly in section showing mechanism for advancing an inking roll which forms a part of the depository;

Fig. 6 is a somewhat schematic view partly in section and partly in elevation showing mechanism for resetting handle stop mechanism;

Fig. 7 is a view in side elevation, partly broken away and in section of the depository, the depository being shown closed;

Fig. 8 is a view in side elevation, partly broken away and in section of the depository, the depository being shown open;

Fig. 9 is a view in section taken along a line IX—IX in Fig. 8;

Fig. 9a is a fragmentary detailed view showing operation of a pawl release yoke, the yoke being shown displaced from the position shown in Fig. 8;

Fig. 9b is a view in section taken along a line IX—IX in Fig. 9a;

Fig. 10 is a somewhat schematic view, partly in side elevation and partly in section showing operation of a hammer member which forms a part of the depository, the hammer being shown in the instantaneous position assumed as the hammer hits an envelope in the depository;

Fig. 11 is a fragmentary view in section showing details of a knife operating cam and of a wiper for removing a package from the receptacle;

Fig. 14 is a fragmentary view in section showing details of a pawl release arm actuated by the yoke illustrated in Figs. 8 and 9a and of cam followers on a knife support plate;

Fig. 15 is a view in section taken along a line XV—XV in Fig. 13;

Fig. 16 is a view in section taken along a line XVI—XVI in Fig. 15;

Fig. 17 is a view in section taken along a line XVII—XVII in Fig. 15;

Fig. 18 is a schematic view in section showing operation of the pawl and pawl release arm;

Fig. 19 is a view in section taken along a line XIX—XIX in Fig. 13;

Fig. 20 is a view in section taken along a line XX—XX in Fig. 3;

Fig. 21 is a fragmentary view in section showing the door and door support frame in open position;

Fig. 22 is a view in section taken along a line XXII—XXII in Fig. 2;

Fig. 23 is a plan view of a strip of tickets;

Fig. 24 is a view in section taken along a line XXIV—XXIV in Fig. 23;

Fig. 25 is a sectional view taken along a line XXV—XXV in Fig. 3;

Fig. 26 is a fragmentary view in side elevation taken on a line XXVI—XXVI in Fig. 13;

Fig. 27 is an enlarged view partly in elevation and partly in section showing ticket folding mechanism in position as the ticket folding operation commences;

Figure 3:
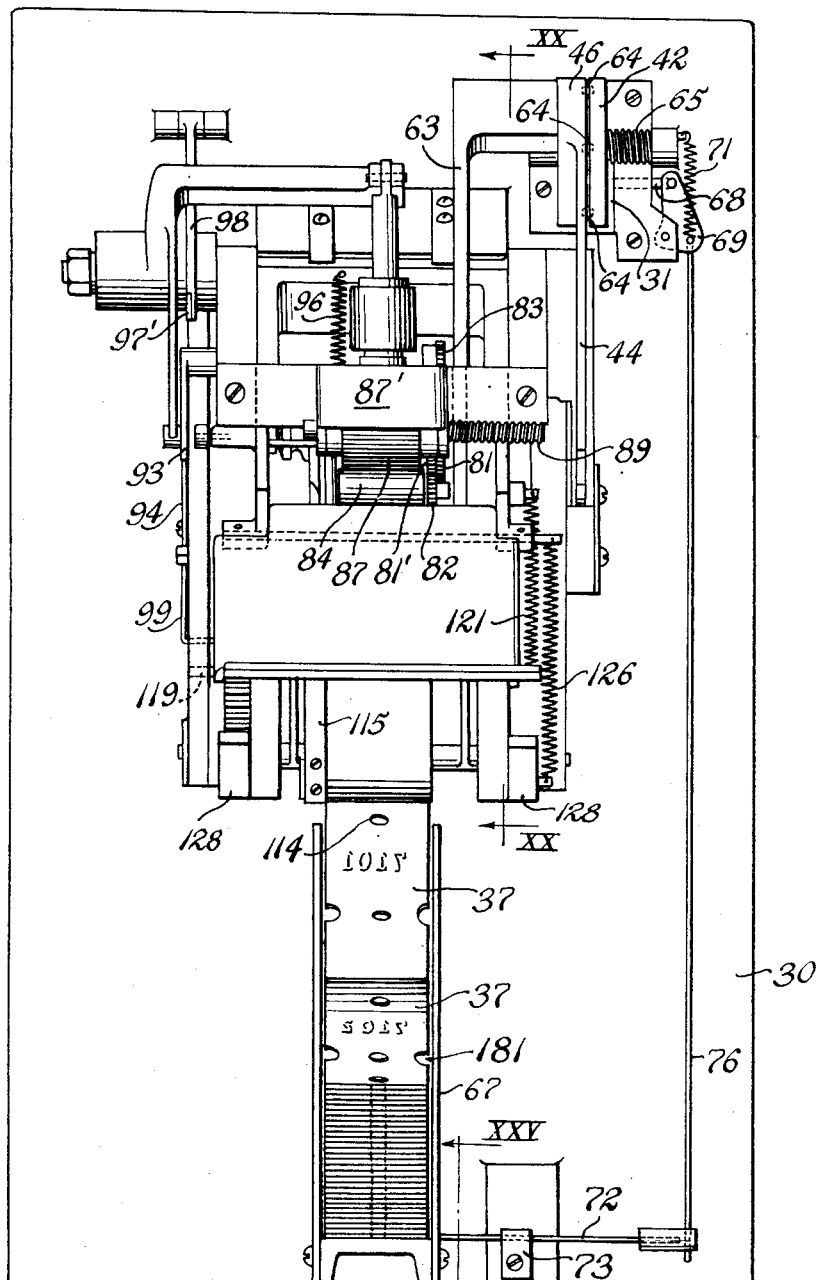
Fig. 3 is a view in rear elevation of the depository.

Fig. 28 is an enlarged view partly in elevation and partly in section showing the ticket folding mechanism in position after the ticket has been folded and the ticket has been cut off; and Fig. 29 is a perspective view of a handle and segment assembly which forms a part of the mechanism for operating the depository, the handle and segment assembly being shown removed from the depository and, the segments being shown in the condition prior to attaching operating mechanism.

In the following detailed description and the drawings, like reference characters indicate like parts.

In Fig. 1 the outside panel of the depository is indicated at 30. The panel 30 may be mounted in any suitable manner in an outside wall 30' of a bank or other building where deposits are to be made in the absence of any attendant. The panel 30 is provided with a coin opening 31 through which an appropriate coin may be inserted for releasing the door of the depository. A handle 32 projects outwardly from the panel 30. A slot 33 is provided in the panel through which a receipt is issued when a deposit is made.

The handle 32 actuates two segment arms 52 and 95 (Fig. 29) which are attached thereto and can be swung in and out of the depository with the handle 32 to actuate the mechanism of the depository. When the handle 32 is pulled outwardly of the depository, a door 34 (Fig. 15) is uncovered behind the handle, and, when the handle is pulled fully out, the door 34 is opened to reveal a slot 36 into which an appropriate package or envelope 36' (Fig. 10) may be inserted. When the handle is pushed in, the door 34 closes to cover the slot 36 and prevent removal of the package. While in the slot 36, the package may be stamped with appropriate indicia. The indicia are provided by tickets 37 (Figs. 23 and 24) which are fed through a ticket holding slot 38 (Figs. 5 and 10) inside the receptacle. Each ticket, as shown in Figs. 23 and 24 bears embossed indicia 39 and the indicia are exposed in the slot. The indicia 39 are inked while in the slot and the package and inked indicia are brought together inside the receptacle to print on the package the same indicia which appear on the ticket. Then, as the handle 32 is pushed inwardly, the package is released and the ticket is dispensed through the ticket slot 33 to form a receipt and record of the deposit transaction. When the handle is fully in, a cross bar 40 (Fig. 11) attached to the handle 32 covers the door 34 and the depository is locked shut. The tickets are folded before being dispensed so that the inked indicia are not exposed but are covered when dispensed.

The device which has to this point been described in general terms will now be described in greater detail.

Figure 12:
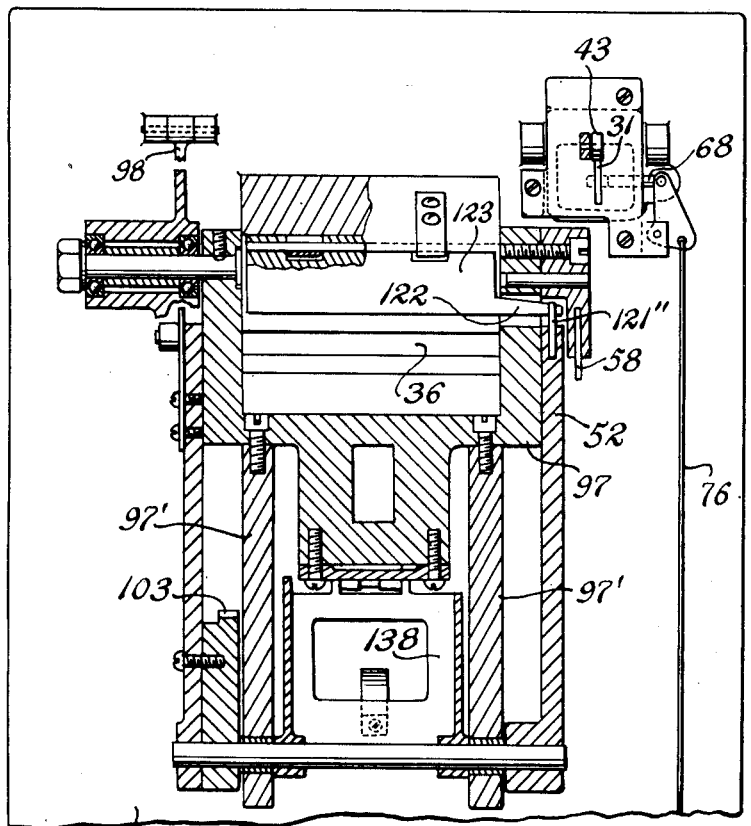
Fig. 12 is a view in section taken along a line XII—XII in Fig. 8.

The handle 32 is released by inserting a coin through the coin slot or opening 31. As indicated in Fig. 4, as a coin 41 is inserted through the coin slot 31, the coin raises the front or forward end of a triangular head or block 42 bearing on a roller 43 (Figs. 4 and 12) at the forward edge of the head 42 to raise the roller 43 and swing a release arm 44 (Figs. 3 and 4) which is attached to a second triangular head 46 (Figs. 3 and 5). When swung downwardly, an end 47 (Fig. 4) of the release arm 44 comes between stop roller discs 48 (Figs. 4 and 13) and bears on an axle pin which extends between the discs to depress the discs against a spring pressed plunger 49 forcing the discs past the plunger into a socket 51 at the outer side of the plunger.

As shown most clearly in Fig. 6, when the disc 48 is in the socket 51, the handle 32, a radial arm 51', and a segment arm 52 which extends between the handle 32 and the radial arm 51' can be pulled outwardly, while when the disc is in a socket 53 on the inner side of the plunger 49, the handle 32, radial arm 51', and segment arm 52 may be pushed downwardly. However, if the direction of movement of the handle is reversed midway in a stroke, the discs 48 ride upwardly along one of a pair of sloping surfaces 54 to bind against a curved lower surface 56 of an inwardly extending bar 57 which forms a part of and is integral with the front panel 30. The release arm 44 swings through a slot 57' in the bar 57 (Figs. 6 and 13) for releasing the discs. The plunger 49 holds the discs 48 in contact with the surface 54, and when the handle is urged in a direction to cause the discs to ride up one of the sloping surfaces 54, the handle is locked and cannot be advanced. When the handle 32 is pulled fully out, the discs 48 come against a pin 58 on the underside of the curved surface 56 and are automatically reset in the socket 53 so that the handle and arms attached thereto may be pushed inwardly. When the handle 32 and arms have been pushed fully in, the disc 48 comes to rest in a curved slot 61 on the underside of the bar 57, and the handle and arms are locked against outward movement until released by the pivot arm 44.

Ordinarily, the pivot arm 44 may be caused to release the disc 48 whenever a coin is inserted through the coin opening 31. However, as if a package becomes wedged in the slot 36, as indicated at 62 in Fig. 20, an arm 63 attached to the triangular head 46 swings down against the package 62 being stopped thereby at the position indicated in dot-dash lines at 63a. If no package is stuck in the slot, the arm 63 swings down to a position indicated in dot-dash lines at 63b where the arm 44 (Fig. 4) releases the discs 48, as already explained. However, if an envelope is stuck in the slot, the arm 63 comes to rest at the position shown at 63a in Fig. 20 abutting the stuck envelope 62.

As shown in Figs. 3, 5, and 22, the triangular heads 42 and 46 are connected by three ball bearing connections 64, each of which ball bearings is disposed in conical sockets in adjacent faces of the triangular heads, and the heads can be separated against the force of a spring 65. If a coin is inserted into the coin opening when an envelope is stuck in the receptacle 36, the arm 63 prevents turning of the heads 42 and 46 sufficiently to cause release of the discs 48 and, as the coin is pushed into the coin slot, the heads 42 and 46 are driven apart, the head 42 moving away from the head 46 as the ball bearings 64 advance out of their sockets until the head 46 is behind the coin slot 31 preventing further advance of the coin. The head 42 can advance until a stop sleeve 66 (Fig. 22) engages a bracket arm 66' which limits sidewise movement of the head 42. The stop sleeve 66 acts to limit separation of the heads so that the heads cannot be separated sufficiently to permit the ball bearings 64 to ride out of their sockets.

As long as the heads 42 and 46 are not forced apart, sufficient space is provided between the head 42 and a block 66", which is attached to the panel 30 on the other side of the coin slot 31, to permit a coin to pass therebetween. However, when the heads 42 and 46 are separated, the head 42 moves behind the coin slot 31 and prevents further insertion of the coin. If an attempt is made to further rotate the head 42 by means of a tool other than a coin when the heads have been separated, the head 42 will swing against the block 66" to limit the turning of the heads.

So long as there are tickets 37 in a ticket holding rack 67 (Figs. 2 and 3) it is possible to insert a coin at least part way into the coin opening. However, when all tickets have been removed from the rack 67 a pin 68 moves to the left as shown in Fig. 3 through a block 66" and across the coin opening 31 to close the coin opening. The pin is carried by a bell crank 69, and a spring 71 constantly urges the bell crank upwardly to drive the pin 68 across the coin opening. However, as long as tickets remain in the rack 67, a lever arm 72 is held up, as shown in Fig. 25 by the lowermost ticket. As shown in Fig. 3, the lever arm 72 is carried by link 73 which is pivoted on the panel 30, and when the left hand end of the lever arm 72 is released, it falls into a slot 74 (Fig. 25) and the right hand end of the lever arm 72 rises permitting a pull rod 76 attached to the bell crank to rise and release the bell crank to drive the pin across the coin opening 31. The coin slot 31 is closed by the pin 68 before all tickets are expended so that a new strip of tickets can be attached to the free end of the old strip without need for rethreading tickets.

Figure 13:
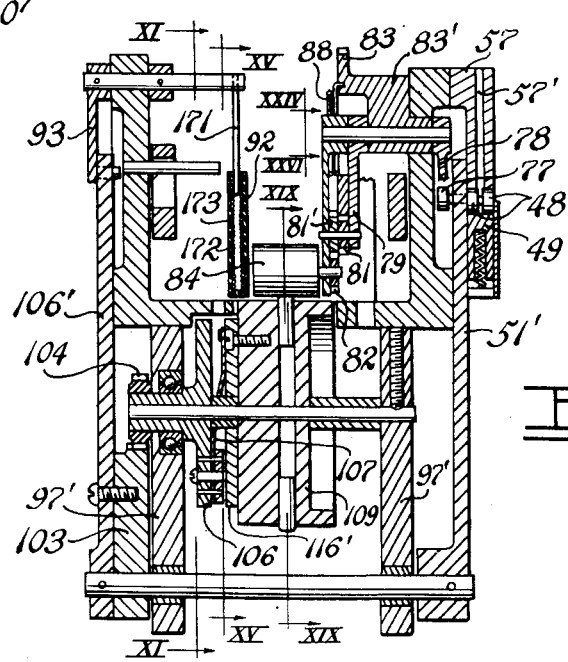
Fig. 13 is a view partly in section taken generally along a line XIII—XIII in Fig. 8.

As the handle 32 is pulled outwardly, a roller 77 (Figs. 5 and 13) attached to the segment arm 52 engages a pivoted ink roller actuator arm 78 and, as the handle is pulled further out, the actuator arm is swung counterclockwise as shown in Fig. 5 from the position shown in full lines to the position shown in dotted lines at 78a. The actuator arm 78 drives an arm 79 which carries compound planetary gears 81, 81' and 82 (Figs. 3 and 5). The gear 81 swings about a stationary or sun gear 83, which is a part of a support hub 83' which is attached to the panel 30. The gears 81 and 81' rotate together as shown in Figs. 3 and 13. The planetary gears rotate as they swing about the sun gear, and an inking roll 84 turns and swings with the gear 82. The roll 84 carries an end of an inking ribbon 86. The other end of the ribbon 86 is attached to a spring loaded ink holding roll 87 which is rotatably mounted on a stationary ribbon roll bracket 87'. As the planetary gears and the roll 84 swing about the sun gear 83 the ribbon is wound upon the roll 84 and, at the lowermost point reached by the roll 84, the roll 84 and the ribbon on the roll 84 come against the indicia on a ticket in the ticket holder 38 to ink the indicia as indicated in dot-dash lines in Fig. 5. The gearing is arranged so that the inking roll has a rolling motion as it crosses the ticket, rolling in a hypocycloidal manner over the ticket and indicia without dragging over the ticket. Then, as the handle is pulled further out, the roller 77 passes beyond the actuator arm 78, and a spring 88 returns the planetary gears to the position shown in full lines in Fig. 5, while a spring 89 (Fig. 3) rewinds the ribbon on the roll 87. A leaf spring 91 limits the return of the actuator arm 78 and the leaf spring 91 sets the actuator arm 78 in position to be caught by the roller 77 during the next operation of the depository. On the return stroke of the segment arm 52 and roller 77, the actuator arm 78 is pushed backwardly against the leaf spring and a lost motion connection shown in Fig. 26 between the actuator arm 78 and the gear carrying arm 79 permits the actuator arm to swing backwardly against the leaf spring without moving the planetary gears and inking roller. As shown in Fig. 26, the arm 79 swings with a slotted hub 91'. A key 91" fits in the slot of the hub 91' and is attached to the arm 78. When the arm 78 is pushed back against the leaf spring 91, the key can swing in the slot of the hub 91' without moving the arm 79 until the roller can pass under the arm 78.

The ink holding roll 87 forms a reservoir of ink for inking the ribbon 86 and the roll 87 may be formed of felt or other suitable material which can hold a supply of ink so that the roll 87 automatically replenishes the ink of the ribbon 86. The ribbon 86 automatically picks up sufficient ink from the roll 87 for inking each ticket as it passes through the ticket holder 38, As the handle is pulled outwardly, a wiper arm 92 (Fig. 11) is reset. The wiper arm 92 serves to eject envelopes from the slot or receptacle 36. As shown, the wiper arm is pivoted to the stationary framework of the depository as shown in Fig. 13 and swings through the slot 36 following imprinting of a package or envelope to eject the package or envelope from the slot 36. A finger or actuator arm 93 (Figs. 7 and 13) serves to actuate the wiper near the end of the closing stroke of the handle 32. As shown in Fig. 7, the actuator arm 93 is actuated by a spring finger 94 which in turn is attached to a right segment arm 95 which can be pulled in and out by the handle 32. As the handle 32 and segment arm 95 are pulled outwardly, the finger 94 releases the wiper actuator arm 93 and a spring 96 (Fig. 11) pulls the wiper 92 back to reset the wiper. A pin 96' (Fig. 8) attached to a stationary member 97 limits the return of the wiper arm. As shown in Figs. 15 and 19, the member 97 forms the lower surface of the receptacle or slot 36. The member 97 is attached to plates 97' (Fig. 21) which are integral with and extend inwardly from the front panel 30 so that the member 97 is stationary. A plate 97" attached to upstanding portions of the member 97 forms the upper surface of the receptacle or slot 36, as shown in Figs. 14 and 15.

As the handle 32 is pulled further out, the spring finger 94 moves outwardly to the position shown in Fig. 8, passing over a beveled surface 97'" (Figs. 8 and 9) of a pivoted hammer actuator arm 98.

As the handle 32 is pulled outwardly, a spring pressed pin 99 which extends through the right segment arm 95 rides over a bevel 101 (Figs. 9a and 9b) on a pivoted yoke 102 and seats between the arms of the yoke.

At the same time, as the handle 32 is pulled outwardly, a gear segment 103 (Fig. 8) rotates a pinion 104 (Figs. 8 and 13) and swings a circular cam 106 through an angle of a little more than 180 degrees. The gear segment 103 is attached to radial arms 106' which swing with and are integral with the segment arm 95. A pawl spring 107 (Fig. 13) attached to the cam 106 swings with the cam 106 between a position shown in Fig. 15 and a position shown in Fig. 28, passing over one of three spaced ratchet pins 108 attached to a ticket drive sprocket wheel 109. As shown in Fig. 17, each of the pins 108 has a beveled or slanting outer surface 111, which cooperates with a beveled surface 112 of the pawl spring to permit the pawl spring to ride over the ratchet pin.

As shown in Fig. 19, the ticket drive wheel includes a plurality of radial outwardly extending posts or sprockets 113 which can engage perforations 114 in the tickets (see Fig. 23). During the handle opening stroke, the ticket drive sprocket wheel 109 remains stationary, being held in place by a spring pressed detent 115 (Figs. 15 and 18) which extends into one of three cam slots 116 in the periphery of a circular cam 116' attached to the ticket drive wheel.

As shown in Figs. 2 and 7, at the start of the stroke in which the handle 32 is pulled outwardly, a scoop or rear door 118 is raised so that the receptacle slot is open at its lower end to permit any package or envelope therein to fall free from the slot through the rear opening thereof. However, as the handle is pulled outwardly, a pin 119 (Fig. 7) attached to the right segment arm 95 engages a slot 120 in a side wall of the scoop and swings the rear door upwardly until the rear door comes against the underside of a door support frame 121 to which the rear door is pivoted, as shown in Fig. 10. A spring 121' holds the rear door in position with the slot 120 in engagement with the pin 119.

At the end of the opening stroke, a pin 121" (Fig. 12) attached to the segment arm 52, is brought against an actuator arm extension 122 of a pivoted spring loaded door locking plate 123 and advances the plate from the position shown in Figs. 11 and 19 in which the plate 123 locks the door 34 shut to close the entrance to the receptacle 36 to a released position shown in Fig. 21 where the door is released. A spring 126 (Fig. 2) pulls the door to open position. At the same time, the pin 58 (Figs. 2 and 6) moves the handle lock discs 48 into the socket 53 so that thereafter, the handle may be pushed inwardly. As the door 34 opens, the rear door falls from the position shown in Fig. 10 to the position shown in Fig. 8 swinging with the door support frame 121 as the support frame swings in opening the door 34. The door frame 121 swings about a pivot 127 (Fig. 21), and so long as the door 34 is open, it is impossible to open the rear door, for stops 128 hold the rear door shut. Each of the stops 128 is attached to and forms a part of one of the stationary plates 97' (Fig. 8).

Finally as the handle is pulled outwardly, a ticket severing knife 131 (Figs. 11, 27 and 28) is raised to ticket cutting position. The knife is carried by a pivoted knife support plate 132. A roller 133 attached to the knife support plate 132 rides on a cam surface 134 of the circular cam 106, and, as the cam 106 is turned during outward movement of the handle 32, the roller 133 follows the cam surface 134 to raise the knife above a ticket discharge slot 136 to the position shown in Fig. 27. The roller 133 is held down against the cam surface by a spring 137 which urges the knife bracket and blade downwardly.

An end of a pivoted cam follower 138 also follows the cam surface 134. The cam follower 138 carries a transverse ticket folding plate 139 which extends through a slot in the lower wall of the ticket discharge slot 33 and, when the follower 138 is forced to the left, as shown in Fig. 27, the plate 139 extends across the ticket discharge slot, as shown in Figs. 19 and 27. A spring holds the plate 139 erect until an end of a ticket comes against it to force the plate against an arcuate surface 142 in the inner wall of the outside panel 30 to direct tickets against the arcuate surface as the tickets leave the ticket drive wheel.

Then, when the door 34 is open, a package can be inserted into the slot 36.

When the envelope 36' has been inserted in the slot 36, as shown in Fig. 10, the handle is pushed inwardly whereupon the indicia of the ticket in the ticket slot 38 are imprinted on the envelope and the depository issues the ticket as a receipt for the deposit.

As the handle 32 is pushed inwardly, the first operation is the closing of the door 34. A roller 144 (Fig. 8) attached to the right side of the door support frame 121 rides upwardly along a cam surface 146 on the right segment arm 95 to swing the frame and door 34 shut so as to prevent removal of the envelope after it has been stamped in the depository. When the door 34 is shut, springs 147 (Fig. 11) force the door locking plate 123 into a groove 148 (Fig. 21) in the door 34 to hold the door closed. After the door 34 has been closed, it is not possible to reopen the door 34 until after the handle 32 has been pushed fully in, for the one-way mechanism including the discs 48 (Figs. 4 and 6) already described prevents the handle 32 from being pulled outwardly once it has started in.

As the handle is pushed inwardly the spring finger 94 (Fig. 10) comes against the hammer release or actuator arm 98 and releases a spring loaded hammer 149 so that the hammer 149 can come against the envelope 36' to force the envelope against the indicia on the ticket in the ticket slot 36. As shown in Fig. 19, the hammer is loaded by a spring 151 attached to the upper wall of the slot 36. The hammer is held upwardly by a hammer support arm 152 (Figs. 7 and 10) which is pivoted to the front panel. A hammer support segment 153 which swings with the hammer support arm is provided with a shoulder 154 for abutting a cooperating shoulder 156 on the hammer release arm, and, when the spring finger 94 reaches the position shown in Fig. 10 the hammer release arm is raised to release the hammer so that the hammer falls with a sudden blow. As shown in Fig. 19, a plate 156' overlies the spring 151 and pre-loads the spring. The hammer 149 may be provided with a resilient head 156'' so that the weight of the blow is spread over the portion of the envelope in contact with the ticket indicia.

A weight 157 is slideable along a rod 158 which connects the hammer head to the hammer support arm 152. The weight acts as a shock absorber or damper to prevent the hammer from rebounding repeatedly against the envelope 36'. Leather washers or the like 159 also are slideable along the rod 158 to help absorb and dampen the hammer rebound. The hammer is moved downwardly by spring 151 at a higher rate of speed than the speed at which the weight 157 falls by gravity so that when the hammer hits the envelope 36', the weight will be in the position shown in Fig. 10 from which it meets the hammer on its rebound and prevents the spring rebounding above its neutral position. Thus, the weight prevents the hammer from reversing and striking the envelope 36 a second time so that only a single impression of the indicia is made on the envelope. Following the hammer blow, the spring arm 151 raises the hammer to a neutral position at which the spring arm is substantially unflexed and the hammer is above and away from the envelope. The construction of the hammer actuating mechanism, as shown, provides a heavier blow or impact on a relatively thick envelope than is received by a relatively thin envelope, for after the spring passes its neutral or straight position, the spring retards the downward speed of the hammer. Thus, a thick envelope, which requires a heavier impact to force it against the inked ticket indicia, receives a heavier impact than does a thin envelope which requires a lesser impact.

As the handle 32 is pushed inwardly, the spring-pressed pin 99 (Fig. 8) causes the yoke 102 to swing from the position shown in Fig. 8 to that shown in Fig. 9a. A shaft 161 (Fig. 14), which extends through the pivot about which the door support frame 121 swings, is attached to and turns with the yoke 102. A pawl release arm or discriminator 162 is rotatably mounted upon the shaft 161 and is linked to rotate therewith by a spring loaded friction clutch formed by spherical spring segment 164. The discriminator arm 162 swings with the yoke 102 and shaft 161 so long as the discriminator arm is not retarded.

As shown in Figs. 15 and 18, the discriminator arm 162 can swing down through a slot in the lower wall of the receptacle 36 to the position shown in dot-dash lines in Fig. 15 at 162a where it is in contact with one of the pins 108. However, if an envelope is in the slot 36, as shown in Fig. 18, the envelope catches the discriminator arm 162 and prevents the arm from swinging against the pin 108. If an envelope is in the slot 36 as shown in Fig. 18, when the pawl spring 107 swings counterclockwise, the pawl spring picks up the pin 108 to cause the cam 116' and sprocket wheel 109 to rotate with the pawl spring 107. However, if there is no envelope in the slot 36, the discriminator arm 162 swings against the pin 108 (as shown in Fig. 15), and a beveled surface 166 (Fig. 16) at the end of the discriminator arm 162 permits the pawl spring 107 to ride over the pin 108 without engaging the pin, whereby if no envelope is in the slot 36, the sprocket wheel 109 cannot be advanced and no ticket can be issued, but when an envelope is disposed in the slot 36, the pawl spring 107 engages one of the pins 108 and the ticket sprocket wheel 109 turns with the cam wheel 106 for one-third revolution.

As the ticket sprocket wheel is advanced, a ticket is fed toward the ticket slot 33 (Figs. 19, 27 and 28). However, the transverse ticket folding plate 139 causes the ticket to follow the arcuate surface 142 at first so that the ticket starts to fold.

As the ticket is fed against the arcuate surface 142 (Fig. 27) the cam follower 138 (Fig. 11) swings back to the right withdrawing the ticket folding plate 139 from the ticket slot (Fig. 28) so that the ticket can fold and extend outwardly through the ticket slot 33. As shown in Fig. 23, each ticket is provided with a line of weakening 166' upon which the ticket readily folds. As the ticket is delivered, it is folded upon itself along the line of weakening 166' with the inked indicia inside so that the ink on the indicia is not exposed but is covered by the folded ticket. The ticket is feed out of the slot 33 with the line of weakening 166' first, and the depositor receives a ticket in which no inked surface is exposed.

As the handle 32 is pushed further inwardly, a pin 167 (Figs. 9a and 9b) attached to the right segment arm 95 comes against the lower side of the yoke 102 and causes the yoke to swing back to the position shown in Fig. 8. As the yoke returns, the discriminator arm 162 is raised until it comes against a pin 168 (Fig. 11) which acts as a limit for resetting the discriminator arm.

Meanwhile, the pin 119 (Fig. 10) is advanced toward the slot 120 in the rear scoop or door and, as indicated most clearly in Figs. 7 and 10, the pin 119 engages the slot and, as the handle is pushed further in, the pin 119 swings the rear door to fully open position shown in Fig. 7 to release the envelope from the slot 36 so that the envelope can fall into a vault 169, indicated schematically in Fig. 2. The vault may be provided with appropriate baffles and the like of usual form to prevent fishing for packages. The rear door or scoop 118 and the door 34 are both mounted on the door support frame 121. The rear door is held closed as long as the front door is open and as the front door is being opened or closed, the rear door only swings between the positions shown in Figs. 8 and 10 in both of which the rear door is held closed by the stops 128. Only when the front door is fully closed does the pin 119 catch the rear door to swing the rear door open, as shown in Fig. 7.

As the handle 32 is pushed inwardly, the spring finger 94 engages the wiper actuator arm 93 to swing the wiper 92 through the slot 36 to force the envelope from the slot. As shown in Fig. 13, the wiper 92 is supported on a pivoted rod 171. The wiper is formed of a rubber sheath 172 which covers a tightly wound coil spring 173. The rubber may be vulcanized to the convolutions of the spring so that the spring and rubber sheath form a strong yet yieldable whole of great durability capable of exerting a strong yet resilient sweeping force for clearing envelopes from the receptacle slot 36.

As the handle 32 is pushed further in, a roll 174 (Figs. 7 and 8) on the right segment arm 95 engages a hammer reset finger 176 which is attached to the hammer support arm and raises the hammer reset finger and support arm to cock or reset the hammer in position for the next cycle of operation of the depository.

As the cam 106 (Fig. 11) swings back counterclockwise while the handle 32 is pushed in, the sprocket wheel 109 swings with the cam 106 provided an envelope or package is in the slot 36. The circular cam 116' turns with the sprocket wheel 109. As shown in Fig. 15, the circular cam 116' of the wheel 109 supports the knife after the cams start turning together. The knife is supported by a cam follower 179 which follows the surface of the cam 116' of the sprocket wheel, and the knife is supported until the ticket has been folded and discharged through the ticket slot 33. Then the cam follower 179 rides into one of the V-shaped slots 116 to permit the knife 131 to fall abruptly severing the ticket. As shown in Fig. 28, the knife blade shears the ticket upon the edge of a shear plate 180 which forms the bottom of the ticket discharge slot. As shown in Fig. 23 the tickets may be provided with cutaway side portions 181 opposite alternate sprocket perforations, and the tickets are separated and cut off at the position of these cut-away side portions. As the knife blade and knife support bracket fall, their fall is retarded by a rubber bumper 180 (Figs. 27 and 28) which catches the falling knife bracket and supports the knife, absorbing the blow of the knife's fall.

Finally, when the handle 32 has been pushed fully in, the one-way mechanism discs 48 (Fig. 4) rise into a slot 61 which locks the handle in closed position until the discs of the one-way stop mechanism are released.

Operation of the depository is simple and will be clear from the foregoing detailed description and the drawings. The depositor first inserts a coin through the coin opening 31 to release the one-way mechanism. Then he can pull the handle 32 outwardly to cause the inking of a receipt ticket. When the handle 32 is pulled fully out, the door 34 opens to give access to the receptacle slot 36. Then he inserts an envelope in the slot and pushes the handle 32 in to cause the depository to print the ticket's indicia on the envelope and issue the ticket as a receipt. The receipt ticket forms a record of the deposit and bears the same indicia as the envelope. If a package becomes lodged in the slot, the coin operated door release is rendered inoperative so that a subsequent depositor cannot reach the lodged package and the depository cannot be actuated until the lodged package is removed. On the other hand, if the door is opened and closed again without the insertion of a package or envelope, no receipt ticket is issued.

In other receipt issuing depositories which have been proposed heretofore, there is no positive provision of means for insuring that the same indicia appear both on the receipt ticket and on the package or envelope deposited therein. With the present depository, the receipt is the same ticket which acts to print indicia on the envelope or package deposited in the depository so that the ticket issued always bears the same indicia as the package or envelope.

The operation of the discriminator arm 162 prevents the issuance of a ticket unless the envelope or package is disposed in the slot 36, for the discriminator arm 162 prevents the pawl spring 107 from engaging the pin 108 (Fig. 15) when the slot 36 is empty. Only when an envelope or package is in the slot 36 is the discriminator arm 162 held away from the pins 108 so that the pawl spring can engage one of the pins to advance the sprocket wheel and tickets.

Once a package or envelope has been inserted in the slot 36 and the door 34 has been closed, it is impossible to remove the package or envelope from the depository. The one-way mechanism actuated by the discs 48 (Figs. 4 and 6) prevents the handle from being pulled outwardly once it has started in. When the handle is pushed fully in, the discs 48 rise into the slot 61 locking the handle in. The discs cannot be moved to release the handle if a package is lodged in the slot 36, for, as shown in Fig. 20, the arm 63 is caught by the package to prevent the arm 44 from being swung into position to release the depository.

The arm 34 and the rear door or scoop 118 are both mounted on the door support frame 121, and when one of the doors is open the other is held closed so that the slot 36 is closed at one end or the other at all times.

The depository is wholly mechanical in operation requiring no electrical or hydraulic connections.

The depository of this invention is subject to various structural modifications without departing from the spirit or scope of the appended claims.

Having described our invention what we claim as novel and desire to secure by Letters Patent is:

1. In a receipt issuing depository the combination which comprises a receptacle, a receipt ticket magazine spaced from the receptacle, a strip of receipt tickets in said magazine, each of said receipt tickets having embossed indicia thereon, a ticket holder in said receptacle adapted to hold one of said tickets with the indicia exposed in the receptacle, means for advancing the tickets of said strip into the ticket holder one at a time, a door for said receptacle adapted when closed to conceal the ticket holder, a handle movable for opening and closing said door and for actuating mechanism of the depository, an inker for applying ink to the embossed indicia on the ticket in the receptacle, mechanism actuated by advancing the handle in a direction to open the door for causing the inker to apply ink to the embossed indicia prior to opening of the door, a holder within said receptacle for a package deposited therein through said door, a hammer adapted to bring the package against the embossed indicia of the receipt ticket in the ticket holder to print the indicia on the package when the handle is advanced in door closing direction following closing of the door, means for releasing the holder after the hammer has brought the package and the receipt ticket together, mechanism actuated by the handle for causing the ticket advancing means to advance the strip one receipt ticket length as the handle is advanced in door closing direction to advance a second receipt ticket into the ticket holder, and means for issuing the first receipt ticket when the second receipt ticket is advanced into the holder.

2. In a receipt issuing depository, the combination of a receptacle, means for introducing a receipt ticket having embossed indicia into said receptacle, means for applying ink to the embossed indicia, said receptacle having an opening for introducing a package into said receptacle, means for bringing said package and said receipt ticket together to cause the indicia to be printed on the package, means for issuing the receipt ticket after the package has been brought against the indicia, and means for releasing the package from the receptacle after the indicia has been printed thereon.

3. In a receipt issuing depository, the combination of a receptacle, means for holding a receipt ticket having embossed indicia thereon in said receptacle with the indicia exposed, an entrance door for said receptacle, means for inking the indicia on the ticket, means for opening the door following inking of the indicia to permit introduction of a package into said receptacle, means for closing the entrance door, means for bringing the package and the receipt together following closing of the entrance door, whereby the indicia are printed on the package, means for releasing the package from the receptacle, and means for issuing the receipt ticket after the package has been brought against the indicia.

4. In a receipt issuing depository, the combination of a receptacle, a ticket holder in said receptacle, a magazine for tickets, receipt tickets in said magazine having embossed indicia thereon, means for advancing said tickets into said holder one at a time, an entrance door for said receptacle adapted when closed to conceal the ticket holder, a handle for opening and closing said door, an inker actuated by said handle and adapted to apply ink to the embossed indicia of a ticket in said holder as said handle is advanced in a direction to open the door, the handle being adapted to open the door following inking of the indicia, a holder within said receptacle for a package deposited therein through said door, a door closer actuated by said handle, a hammer adapted to bring the package against the inked embossed indicia on the ticket as the handle is advanced in door closing direction following closing of the door to print the indicia on the package, mechanism actuated by said handle for issuing said ticket after the hammer has brought the package against the indicia and for introducing a second ticket into the receptacle, and means for releasing the package holder to empty the receptacle following printing of the package.

5. In a receipt issuing depository, the combination of a receptacle, means for introducing an elongated receipt ticket having embossed indicia and a transverse line of weakening into said receptacle, means for applying ink to the embossed indicia, said receptacle having an opening for introducing a package into said receptacle, means for bringing said package and said receipt together to cause the indicia to be printed on the package, a ticket delivery slot, means for advancing the receipt ticket into said slot after the package and ticket have been brought together, a receipt folding plate removably disposable across said slot and adapted to engage the forward end of the ticket to turn the forward end of the ticket out of the slot, said slot having a wall apertured to permit the ticket to turn out of the slot, and means for withdrawing the ticket folding plate from the slot after the end of the ticket has been turned out of the slot into the aperture, the plate being adapted to fold the receipt ticket along the line of weakening with the inked indicia inside, whereby the folded receipt is delivered from the slot with the line of weakening first.

6. In a receipt issuing depository, the combination of a receptacle, means for introducing a receipt ticket having embossed indicia into said receptacle with the indicia exposed in the receptacle, means for applying ink to the embossed indicia, means for holding a package in said receptacle, a hammer for bringing said package and said receipt ticket together to cause the indicia to be printed on the package, a leaf spring attached to said hammer, means for holding said hammer cocked in a position elevated from the receptacle with the spring urging the hammer toward the receptacle, means to release the hammer holding means when a package is in the receptacle to cause the hammer to strike the package and force the package against the indicia, means for issuing the ticket after the hammer has struck the package, and means for releasing the package holding means following printing of the indicia thereon to release the package from the receptacle.

7. In a receipt issuing depository, the combination of a receptacle, means for introducing a receipt ticket having embossed indicia into the receptacle with the indicia exposed in the receptacle, means for applying ink to the embossed indicia, means for holding a package in said receptacle, a hammer for bringing the package and the receipt ticket together to cause the indicia to be printed on the package, a leaf spring attached to said hammer, means for holding said hammer cocked in a position elevated from the receptacle with the spring urging the hammer toward the receptacle, means to release the hammer holding means when a package is in the receptacle to cause the hammer to strike the package and force the package against the indicia to print the indicia on the package, the spring being adapted to raise the hammer to a position between the elevated cocked position and the package after the hammer has struck the package, means for issuing the ticket after the hammer has struck the package, and means for releasing the package holding means after the indicia have been printed on the package to release the package from the receptacle.

8. In a receipt issuing depository, the combination of a receptacle, a door for said receptacle, a handle movable in opposite directions for opening and closing said door and for actuating receipt issuing mechanism of the depository, an arm movable with said handle, a stop disc, a holder for said stop disc adjacent the path followed by said arm and opening toward said arm, said holder having a pair of spaced surfaces inclined to the path of the arm and converging spaced from the arm, a plunger in said holder dividing the holder into a pair of socket sections, each socket section being between the plunger and one of the inclined surfaces, means for urging the plunger toward the arm to hold the disc in one of the socket sections with the peripheral edge of the disc against the arm, the disc being adapted to bind against the arm when the arm is moved in a direction to draw the disc along one of the inclined surfaces of the socket section and toward the arm, the arm being free for movement in the opposite direction, and means for shifting the disc between socket sections when the handle is moved in handle opening direction and in handle closing direction to the limit of motion whereby the handle can be moved in one direction only when it has started in that direction until it has been advanced to the limit of movement in that direction.

9. In a receipt issuing depository, the combination of a receptacle, a door for said receptacle, a handle movable to open and close said door, a latch for holding said door in a door closed position, and latch releasing mechanism which comprises a pivotally mounted arm adapted to swing to release the latch, a plate attached to said arm to swing therewith, a second arm attached to said plate and adapted to swing through the receptacle as the first arm swings to release the latch, said plate having a face substantially perpendicular to the axis of rotation, a second plate rotatably mounted upon said axis facing the face of the first plate, the faces of said plates each containing a plurality of wells, each well in the face of the first plate being normally opposite one of the wells in the face of the second plate, a plurality of balls disposed between the said faces in the wells and forming a driving connection between the plates, means for resiliently urging said faces together, means for swinging the second plate to swing the first arm in latch releasing direction, the second arm being adapted to restrain the first plate when a package is lodged in the receptacle, whereby the plates are driven apart when the second plate is swung while a package is lodged in the receptacle, and means to limit swinging of the plates when the plates separate whereby the latch releasing mechanism is rendered inoperative to release the latch when a package is lodged in the receptacle.

10. In a receipt issuing depository the combination which comprises a receptacle, a receipt ticket magazine spaced from the receptacle, a strip of receipt tickets in said magazine, each of said receipt tickets having embossed indicia thereon, a ticket holder in said receptacle adapted to hold one of said tickets with the indicia exposed in the receptacle, means for advancing the tickets of said strip into the ticket holder one at a time, a door for said receptacle adapted when closed to conceal the ticket holder, a handle movable for opening and closing said door and for actuating mechanism of the depository, an inker for applying ink to the embossed indicia on the ticket in the receptacle, mechanism actuated by advancing the handle in a direction to open the door for causing the inker to apply ink to the embossed indicia prior to opening of the door, a holder within said receptacle for a package deposited therein through said door, a hammer adapted to bring the package against the embossed indicia of the receipt ticket in the ticket holder to print the indicia on the package when the handle is advanced in door closing direction following closing of the door, means for releasing the holder after the hammer has brought the package and the receipt ticket together, mechanism actuated by the handle for causing the ticket advancing means to advance the strip one receipt ticket length as the handle is advanced in door closing direction to advance a second receipt ticket into a ticket holder, means to render the ticket advancing mechanism inoperative to advance tickets when the receptacle is void of a package, and means for issuing the first receipt ticket when the second receipt ticket is advanced into the holder.

11. In a receipt issuing depository, the combination of a receptacle, means for introducing a receipt ticket having embossed indicia into said receptacle, means for applying ink to the embossed indicia, said receptacle having an opening for introducing a package into said receptacle, means for bringing said package and said receipt ticket together to cause the indicia to be printed on the package, means for folding the receipt ticket with the inked indicia inside, means for issuing the receipt ticket after the package has been brought against the indicia and the ticket has been folded, and means for releasing the package from the receptacle after the indicia have been printed thereon.

12. In a receipt issuing depository, the combination of a receptacle, means for holding a receipt ticket having embossed indicia thereon in said receptacle with the indicia exposed, an entrance door for said receptacle, means for inking the indicia on the ticket, means for opening the door following inking of the indicia to permit introduction of a package into said receptacle, means for closing the entrance door, means to prevent opening of the entrance door when a package is disposed in the receptacle, means for bringing the package and the receipt ticket together following closing of the entrance door, whereby the indicia are printed on the package, means for releasing the package from the receptacle, and means for issuing the receipt ticket after the package has been brought against the indicia.

13. In a receipt issuing depository, the combination of a receptacle, means for holding a receipt ticket having embossed indicia thereon in said receptacle with the indicia exposed, an entrance door for said receptacle, means for inking the indicia on the ticket, means for opening the door following inking of the indicia to permit introduction of a package into said receptacle, means for closing the entrance door, means for bringing the package and the receipt ticket together following closing of the entrance door, whereby the indicia are printed on the package, means for releasing the package from the receptacle, and means for issuing the receipt ticket after the package has been brought against the indicia, the means for issuing a receipt ticket being adapted to issue a receipt ticket only after a package and the receipt ticket have been brought together.

14. In a receipt issuing depository, the combination of a receptacle, means for introducing a receipt ticket having embossed indicia into the receptacle with the indicia exposed in the receptacle, means for applying ink to the embossed indicia, means for holding a package in said receptacle, a hammer for bringing the package and the receipt ticket together to cause the indicia to be printed on the package, a leaf spring attached to said hammer, a rod attached to and extending upwardly from the hammer to the hammer holding means substantially perpendicular to the leaf spring, means for holding said hammer cocked in a position elevated from the receptacle with the spring urging the hammer toward the receptacle, means to release the hammer holding means when a package is in the receptacle to cause the hammer to strike the package and force the package against the indicia to print the indicia on the package, the spring being adapted to raise the hammer to a position between the elevated cocked position and the package after the hammer has struck the package, a weight slideably mounted on the rod, the weight being adapted to fall along the rod under the influence of gravity at a lesser speed than the hammer falls, the weight being adapted to meet the hammer as the hammer rebounds from the package to halt oscillation of the hammer, means for issuing the ticket after the hammer has struck the package, and means for releasing the package holding means after the indicia have been printed on the package to release the package from the receptacle.

15. In a receipt issuing depository, the combination of a receptacle, means for introducing a receipt ticket having embossed indicia into the receptacle with the indicia exposed in the receptacle, means for applying ink to the embossed indicia, means for holding a package in said receptacle, a hammer for bringing the package and the receipt ticket together to cause the indicia to be printed on the package, a leaf spring attached to said hammer, a plate overlying the leaf spring, means for holding said hammer cocked in a position elevated from the receptacle with the spring urging the hammer toward the receptacle, the leaf spring bearing on the plate between the ends of the leaf spring when the hammer is in elevated position, whereby the spring is loaded when in elevated position, means to release the hammer holding means when a package is in the receptacle to cause the hammer to strike the package and force the package against the indicia to print the indicia on the package, the spring being adapted to raise the hammer to a position between the elevated cocked position and the package after the hammer has struck the package, means for issuing the ticket after the hammer has struck the package, and means for releasing the package holding means after the indicia have been printed on the package to release the package from the receptacle.

16. In a receipt issuing depository, the combination of a receptacle, a door for said receptacle, a pivotally mounted handle movable in opposite directions for opening and closing said door and for actuating receipt issuing mechanism of the depository, an arm movable with said handle, said arm having a surface curved about the pivot, a stop disc, a holder for said stop disc adjacent the path followed by said arm and opening toward said arm, said holder having a pair of spaced surfaces inclined to the path of the arm and converging spaced from the arm, a plunger in said holder dividing the holder into a pair of socket sections, each socket section being between the plunger and one of the inclined surfaces, means for urging the plunger toward the surface of the arm to hold the disc in one of the socket sections with the peripheral edge of the disc against the arm, the disc being adapted to bind against the arm when the arm is moved in a direction to draw the disc along one of the inclined surfaces of the socket section and toward the arm, the arm being free for movement in the opposite direction, and means for shifting the disc between socket sections when the handle is moved in handle opening direction and in handle closing direction to the limit of motion whereby the handle can be moved in one direction only when it has started in that direction until it has been advanced to the limit of movement in that direction.

17. In a receipt issuing depository, the combination of a receptacle, a door for said receptacle, a handle movable in opposite direction for opening and closing said door and for actuating receipt issuing mechanism of the depository, an arm movable with said handle, a stop disc, a holder for said stop disc adjacent the path followed by said arm and opening toward said arm, said holder having a pair of spaced surfaces inclined to the path of the arm and converging spaced from the arm, a plunger in said holder dividing the holder into a pair of socket sections, each socket section being between the plunger and one of the inclined surfaces, means for urging the plunger toward the arm to hold the disc in one of the socket sections with the peripheral edge of the disc against the arm, the disc being adapted to bind against the arm when the arm is moved in a direction to draw the disc along one of the inclined surfaces of the socket section and toward the arm, the arm being free for movement in the opposite direction, the disc being shiftable between socket sections, a lock for locking the handle when advanced to the limit of its movement in door closing direction, a lock release for releasing the lock and shifting the disc from door closing position to door opening position when the handle is at the limit of its movement in door closing direction, means for rendering the lock releasing and resetting means inoperative when a package is lodged in the receptacle, and means for shifting the disc from door opening position to door closing position automatically when the handle is advanced to fully open position, whereby the handle can be moved in one direction only when it has started in that direction until it has advanced to the limit of movement in that direction.

18. In a receipt issuing depository, the combination of a receptacle, a door for said receptacle, a handle movable to open and close said door, a latch for holding said door in a door closed position, and latch releasing mechanism which comprises a pivotally mounted arm adapted to swing to release the latch, a plate attached to said arm to swing therewith, means for preventing axial movement of said plate, a second arm attached to said plate and adapted to swing through the receptacle as the first arm swings to release the latch, said plate having a face substantially perpendicular to the axis of rotation, a second plate rotatably mounted upon said axis facing the face of the first plate, the faces of said plates each containing a plurality of wells, each well in the face of the first plate being normally opposite one of the wells in the face of the second plate, a plurality of balls disposed between the said faces in the wells and forming a driving connection between the plates, means for resiliently urging said faces together, a coin slot adjacent the second plate, means on the second plate normally engageable by a coin in said slot for swinging the second plate to swing the first arm in latch releasing direction, the second arm being adapted to restrain the first plate when a package is lodged in the receptacle, whereby the plates are driven apart when the second plate is swung while a package is lodged in the receptacle, the second plate advancing before the coin slot to prevent insertion of the coin and limit swinging of the plates when the plates separate, whereby the latch releasing mechanism is rendered inoperative to release the latch when a package is lodged in the receptacle.

19. In a receipt issuing depository, the combination of a receptacle, a door for said receptacle, a handle movable to open and close said door, a latch for holding said door in a door closed position, and latch releasing mechanism which comprises a pivotally mounted arm adapted to swing to release the latch, a plate attached to said arm to swing therewith, means for preventing axial movement of said plate, a second arm attached to said plate and adapted to swing through the receptacle as the first arm swings to release the latch, said plate having a face substantially perpendicular to the axis of rotation, a second plate rotatably mounted upon said axis facing the face of the first plate, the faces of said plates each containing a plurality of wells, each well in the face of the first plate being normally opposite one of the wells in the face of the second plate, a plurality of balls disposed between the said faces in the wells and forming a driving connection between the plates, means for resiliently urging said faces together, a coin slot adjacent the second plate, a stationary stop member on the side of the coin slot opposite the second plate, means on said second plate normally engageable by a coin inserted through said coin slot to pass between the second plate and the stop member to swing the plates and arms in latch releasing direction, the second arm being adapted to restrain the first plate when a package is lodged in the receptacle, whereby the plates are driven apart when the second plate is swung while a package is lodged in the receptacle, the second plate advancing before the slot to prevent insertion of the coin therethrough and engaging the stationary member to limit axial movement of the second plate and swinging of the plates when the plates separate, whereby the latch releasing mechanism is rendered inoperative to release the latch when a package is lodged in the receptacle.

JACK N. BINNS.
THOMAS E. DUGLE.
ALVIN F. ALT.

REFERENCES CITED

The following references are of record in the file of this patent:

UNITED STATES PATENTS

| Number | Name | Date |
|---|---|---|
| 543,755 | Savorgnan | July 30, 1895 |
| 1,506,491 | Kline | Aug. 26, 1924 |